United States Patent [19]

Lintunen et al.

[11] 4,292,123
[45] Sep. 29, 1981

[54] PROCEDURE AND APPARATUS FOR CELLULOSE WASHING

[75] Inventors: Tuomo Lintunen; Raimo Kohonen, both of Savonlinna, Finland

[73] Assignee: Enso-Gutzeit Osakeytiö, Helsinki, Finland

[21] Appl. No.: 44,066

[22] Filed: May 31, 1979

[30] Foreign Application Priority Data

Jun. 1, 1978 [FI] Finland .................................. 781743

[51] Int. Cl.³ .............................................. D21C 9/02
[52] U.S. Cl. ........................................ 162/60; 8/156; 68/181 R
[58] Field of Search ...................... 162/60, 43; 210/77, 210/387, 402; 8/156; 68/181 R

[56] References Cited

U.S. PATENT DOCUMENTS

| 2,352,304 | 6/1944 | Young | 210/77 |
| 2,510,254 | 6/1950 | Richter | 210/402 |
| 4,158,297 | 6/1979 | Winch | 68/181 R |

FOREIGN PATENT DOCUMENTS 2844145  5/1979  Fed. Rep. of Germany ........ 162/60

*Primary Examiner*—Peter Chin
*Attorney, Agent, or Firm*—Toren, McGeady and Stanger

[57] ABSTRACT

Procedure and apparatus for the washing of cellulose in the form of a continuous web. The continuous web produced in a concentrating zone is washed in a washing zone comprising between 2 and 6 washing steps, so that into the web pressurized washing liquid is introduced according to the counter-current principle to the purpose of displacing the suspension liquid contained in the web, using one pumping operation for transporting the washing liquid through a plurality of washing steps.

3 Claims, 5 Drawing Figures

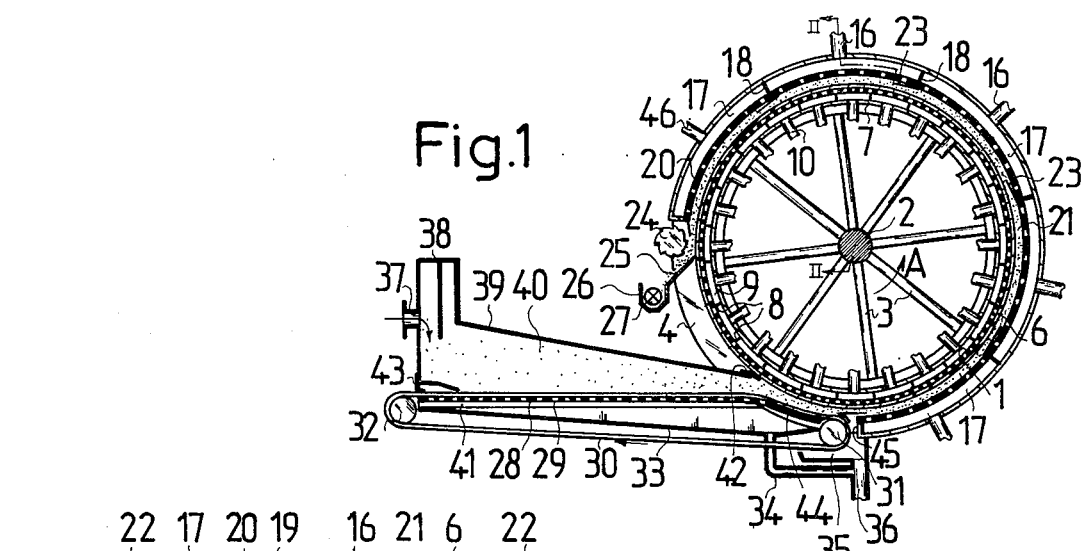
Fig.1
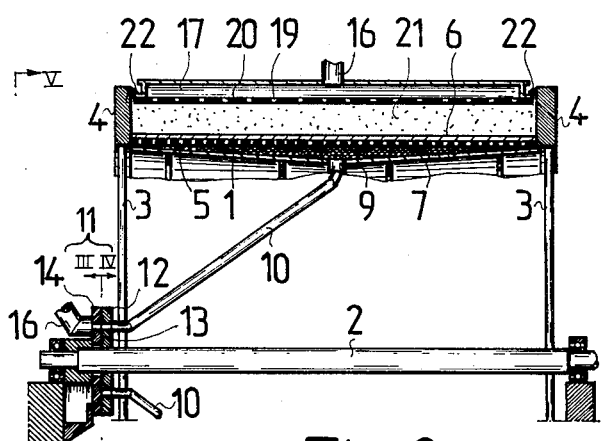
Fig.2
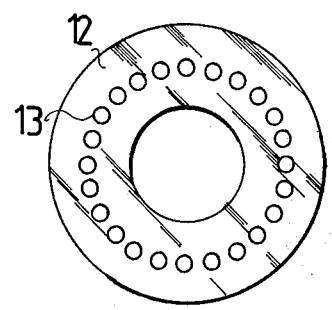
Fig.4
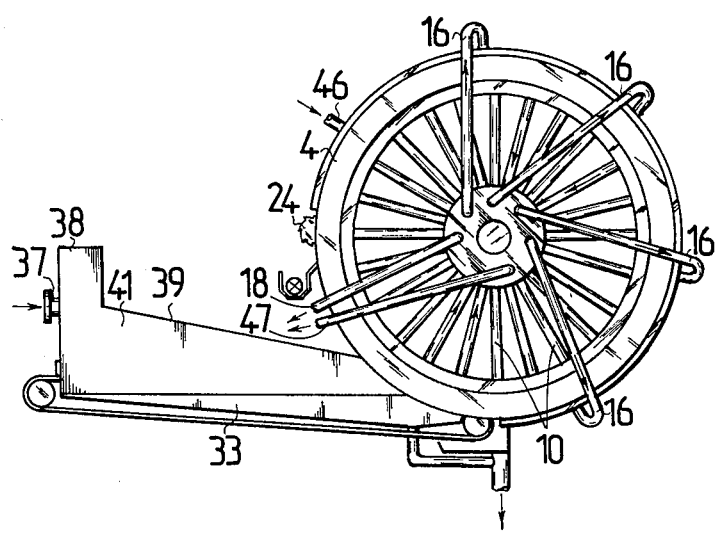
Fig.3
Fig.5

PROCEDURE AND APPARATUS FOR CELLULOSE WASHING

The present invention concerns a procedure for the washing of cellulose in the form of a continuous web, which is formed in a concentrating zone preceding the washing zone proper. Moreover, the invention concerns an apparatus for the washing of cellulose in the form of a continuous web in accordance with the above-mentioned procedure, utilizing a liquid-permeable drum, the fibre web produced in the concentrating process being introduced into the interspace between its shell and a filtering member revolving around it and said web being washed on the shell with a pressurized washing fluid, which displaces suspension liquid from within the fibre web.

The following requirements, among others, are imposed on the efficient washing of cellulose presented in the form of a continuous fibre web:

1. The fibre web from which suspension liquid is being displaced shall be homogenous of its structure.
2. The fibre web shall have uniform thickness.
3. The displacing of suspension liquid shall take place under high pressure, that is, there shall be a high pressure differential between the side of the fibre web contacted by the washing liquid and that side on which the displaced liquid escapes.
4. The dry matter content of the fibre web shall be high throughout the displacing process.
5. The washing liquid must not cause any internal movements between fibres.

The requirements under 1–3 are generally met in a manner known in the art, by feeding the fibre suspension under constant pressure, uniformly divided, through a slit extending over the whole length of the liquid-permeable cylindric drum, onto which the washing liquid is supplied under high pressure on one side of the fibre web, the other side of the fibre web being under normal or subatmospheric pressure.

The requirements stated under 4 and 5 contain those problems which require to be solved if a good washing efficiency is desired at a minimum of washing water consumption.

One type of apparatus suggested as a solution to the problem comprises a rotating drum provided with a perforated shell, around which at a given distance a wire has been arranged to pass so that between the shell and the wire an interspace is defined, which has been divided in the direction of rotation of the drum into two parts: a concentrating zone and a washing zone. In the concentrating zone, liquid is removed from the fibre suspension by pressing through the wire, outwardly, and inwardly through the shell of the drum. In the washing section, pressurized washing liquid is introduced on the surface of the fibre web, whereby the suspension liquid displaced from within the fibre web will penetrate on the other side of the fibre web through the drum shell and into it. The washing zone may be subdivided into several steps so that liquid displaced by the washing water introduced at a stage which is later in the direction of rotation of the drum, and which enters the drum, is reused as washing water by pumping it to an earlier step and by repeating the procedure several times over.

It is a characteristic feature of this apparatus of prior art that over part of the drum shell extends a concentration zone, and to this then adjoins a washing zone, which extends over the remaining part of the drum shell. In other words, while the drum rotates a full revolution, only part of the revolution period which it requires is used towards washing of the fibre web, implying that the whole shell surface of the drum is not in effective use in cellulose washing.

Furthermore, in the said washing apparatus the liquid displaced in the washing zone, and which is comparatively diluted as regards the substances washed out from the fibre web compared with the relatively concentrated solution obtained in the concentrating zone, which solution especially in the case of the black liquor produced in connection with sulphate cellulose digesting is conducted back into the process to be evaporated and regenerated. In that case an increase of the water quantity going to be evaporated will increase, which of course is not desirable.

It is also one of the drawbacks of the apparatus that from within the drum the liquid that has been displaced has to be pumped out with a separate pump and carried to the preceding washing step, whereby the amount of equipment external to the drum increases.

The object of the present invention is to satisfy the requirements 1–3 set up above for the fibre web washing process, without incurring the drawbacks mentioned. This aim is achieved by means of a procedure and apparatus as specified in the claims following below.

In the following, the invention shall be illustrated in detail by the aid of drawings, wherein FIG. 1 presents in longitudinal section an apparatus for carrying out the procedure of the invention, FIG. 2 shows the cross section along line II—II in FIG. 1, FIG. 3 shows the cross section viewed in the direction of line III—III in FIG. 2, FIG. 4 shows the cross section viewd in the direction of line IV—IV in FIG. 2, and FIG. 5 shows the end view viewed in the direction of line V—V in FIG. 2.

The washing zone in the procedure and apparatus of the invention consists of a drum open at both ends and provided with a cylindrical shell 1, and provided with a horizontal central shaft 2. The shaft 2 has been affixed at both ends by radial bars 3 to annular disks 4 at the ends of the drum, to these disks having been affixed an outer shell 1 provided with perforation 5 and thereupon being stretched a filtering member 6, which is preferably a wire fabric of plastic or metal.

Under the outer shell 1 of the drum and spaced therefrom is an unperforated inner shell 7, this shell too being affixed to the annular disks 4, which thereby close the space between the outer and inner shells. The inner shell 7 is, as shown in FIG. 2, shaped like a double cone, tapering from the ends of the drum towards its centre. The space between the outer shell 1 and inner shell 7 is subdivided by partitions 8 parallelling the radius of the drum and having the same length dimension as the drum, into compartments 9, of which the bottoms—owing to the taper of the inner shell 7—thus slope towards the centre of the drum. Each compartment 9 has been connected at its deepest point at the half-way point of the drum's length by a pipe 10 to a drain valve 11 (FIG. 2) at one end of the shaft 1, to that half of the valve (12) (FIG. 2) which has been mounted on the shaft 1 and which presents a round aperture 13 for each pipe 10.

The stationary half 14 of the valve has been provided with elongated apertures 15, as shown in FIG. 3, these apertures being in register with the apertures 13 and having a breadth consistent with that of the apertures 13. The land between the apertures 15 equals the diameter of the aperture 13. The number of apertures 15 is the same as the number of washing zones in the apparatus, and from each aperture departs a pipe 16 having a diameter equal to the length of the aperture 15, from the outer surface of the valve half 14 to each washing zone. Moreover, the valve half 14 presents a smaller elongated aperture 17, which has been connected to the drain pipe 18 (FIG. 5).

The pipes 16 have been connected to stationary washing cases 17 external to the drum and which have been mutually separated in the direction of rotation of the drum by means of partitions 18 having the same width as the drum. The washing cases 17 have a bottom 20 provided with holes 19 and located at a distance from the outer shell 1 of the drum, this distance being determined by the thickness of the pulp stock layer 21 to be washed. As shown in FIG. 1, there are five washing cases, but their number may vary between 2 and 6, depending on the washing effect desired.

The cases 17 have been provided at their ends with seals 22, which during operation press against the annular disks 4, thereby preventing the discharge of pressure through the ends of the cases 17. Furthermore, the cases 17 have in register with the partitions 18, seals 23, which are rubber strips with a length equalling that of the drum and which have preferably a dimension equalling that of the compartment 9 within the drum, so that they cover some of the rows of holes 19 immediately after the partitions 18 in the direction of travel of the drum.

After the last washing case 17 in the direction of rotation of the drum (indicated by arrow A in FIG. 1) there has been placed a roll 24 pressing controllably on the pulp stock web and provided with a serration, which "cuts up" the pulp stock web 21 before it arrives on the doctor blade 25 disposed against the outer shell 1 of the drum, which detaches the pulp stock web and transports it onto a conveyor screw 27 rotating in a trough 26, the pulp stock being transported by this conveyor screw towards subsequent process steps.

Before the washing case 17 which is first in the direction of rotation of the drum (lowermost in FIG. 1) there is a pulp stock concentrating zone, comprising a substantially horizontal bottom 28 provided with a perforation 29. Upon the bottom 28 there runs an endless wire fabric around a drive roll 31 (with stationary location) and a wire tensioning roll 32. To the purpose of collecting the liquid suspension that has passed through the bottom 28 and wire 30, there is under the bottom 28 a save-all 33 provided with a drain pipe 34. Furthermore, there is under the wire 30 in register with the roll 31, a smaller save-all 35, where the liquid splattering from the wire 30 on the roll 31 accumulates. The pipe 34 has been connected to the drain pipe 36 of the save-all 35.

The means serving to feed the pulp stock to be washed consist, as shown in FIG. 1, of a supply box 38 provided with feed connector 37 and located close to the roll 32, the roof plate 39 of this box being inclined in the direction of travel of the wire, so that there is defined a chamber 40 decreasing in height in the direction towards the drum and which has been closed on the sides by plates 41 (FIG. 5). The roof plate 39 is provided, at its end facing the drum, with a resilient seal 42 scraping against the drum, and the wall of the supply box 38 containing the feed connector 37 has been fitted with a seal 43 scraping against the wire 38 and which prevents the discharge, in the entering wire direction, of the liquid suspension present in the chamber 40.

The operation of the apparatus depicted in the drawing is as follows.

The fibre pulp to be washed, which has a consistency between 1 and 4%, is supplied through the feed connector 37 into the supply box 38, where it comes up against the wire 30 retaining the fibres moving towards the drum. Initially, liquid is drained from the fibre pulp by gravity effect through the wire 30 and holes 29 into the save-all 33, but on closer approach to the drum the pulp comes under increasing compression in the chamber 40, between its roof plate 39 and bottom 28. In this connection, part of the fibres also pass through the wire 30 and bottom 28 into the save-all 33. At its arrival on the last section tangential to the drum, 44, of the bottom 28, which is not perforated, the fibre pulp has reached a consistency between 8 and 12% and a coherent fibre course has been formed. At this stage the filtering member 6 rotating along with the drum takes the pulp layer along with it, and it is detached from the wire 30 on the roll 31, against which there is a shoe 45, which has been made of a material with low friction so that the pulp stock will not adhere to it. At the same time, the shoe 45 detaches water from the surface of the wire 30, and this water runs into the save-all 35. The waters coming from save-alls 33 and 35 are combined in the drain pipe 36 and may be used as dilution water in the phase after the pulp digestion, where the fibres contained in this water will be recovered.

In the region between the seal 42 and the roll 31, there is expressed from the pulp stock a comparatively strong spent digestion liquor through the filtering member 6 into the empty compartments 9 at this point, filling them. Subsequently, the pulp stock layer moves into the washing zones on the circumference of the drum, where washing is effected according to the counter-current principle in that into the case 17 which is last in the direction of rotation of the drum, in FIG. 1 above the roll 24, pressurized clean washing liquid is carried from outside the apparatus through the pipe 46, and which settles through the holes 19 in the bottom 20 of the case 17 in the pulp stock web and displaces the liquid present there, which goes through the filtering member 6 and through the holes 5 into the compartments 9 under the washing case 17. From the compartments 9, the liquid passes under pressure effect through the pipes 10 into the valve 11, and after passing through the holes 13,15 there the liquid enters the pipe 16, along which the liquid displaced from within the pulp stock web is pumped in the direction of rotation of the drum always into the preceding washing case 17, until the liquid displaced in the last washing step is drained through the pipe 47 of the valve 11 (FIGS. 3 and 5) to the evaporation plant.

After its circuit of the drum, the pulp stock web 21 is impacted between the roll 24 and the filtering member 6 and pressed there, owing to which liquid—which is comparatively pure—escapes from the web at this point into the compartments 9 under the pulp stock web, whence the liquid departs by the pipes 10 through the hole 13 through hole 17 into the pipe 18 external to the valve 11 (FIG. 5), whence it may be conducted, for instance, into the supply box 38 because the quantity of this liquid is small.

In the apparatus of the invention, the pulp stock layer 21 is not in direct contact with the perforated bottoms 20 of the washing cases 17, since the pressure of the washing liquid urges the pulp stock layer 21 against the filtering member 6 on the surface of the drum. Hereby between the pulp stock web 21 and the foraminous shell 20 there is produced a thin liquid film, owing to the compression. The liquid film which has been formed is interrupted with the aid of the seals 23 between the washing cases 17. The seals 23 operate with the aid of the differential pressure in the different washing cases, because they urge the seals lightly against the pulp stock web 21, whereby the points of the partitions 18 between different washing cases 17 will be sealed.

While in washing equipment of prior art the greatest problems regarding efficient operation are specifically caused by the sealing of different washing steps against each other, these problems have been eliminated in the apparatus of the invention in the manner just described. But the invention is not confined to the embodiments of the disclosure and of the drawings, which may be modified within the scope of the claims following below.

We claim:

1. A method for the washing of cellulose pulp in the form of a continuous web comprising passing the web through a washing zone composed of at least two mutually isolated washing zones and passing a washing liquid through the web in a direction countercurrent to that of the direction of travel of the web wherein a clean pressurized washing liquid is passed first into the last of said washing zones through which the web travels and which displaces an equal volume of suspension liquid contained in the web from said zone, said equal volume being displaced into the washing zone next prior to the next subsequent zone, which, in turn, sequentially displaces an equal volume of suspension liquid in the web into the next sequential zone and wherein the suspension liquid displaced from the web by the clean washing liquid is transferred from one washing zone to the next in sequential means by the means of a single pumping operation utilizing the initial pressure of the clean washing liquid.

2. The method of claim 1 wherein the continuous web is formed by introducing a suspension of cellulose fibers in a liquid into a filtering chamber having a linearly moving filter which moves towards an area communicating with the first of the washing zones in a manner such that increasing pressure is placed upon the suspension as it approaches the first washing zone to thereby express the liquid from the suspension through the filter leaving the continuous web on the traveling filter.

3. The method of claim 2 wherein the continuous web is pressed with a roll to standardize the layer thickness of the web just prior to entering the first washing zone.

* * * * *